United States Patent

[11] 3,624,041

| [72] | Inventors | Johannes Brandrup<br>Neu-Isenburg;<br>Gunter Freund, Hofheim-Taunus; Ludwig<br>Brinkmann, Frankfurt/Main; Horst Pfister,<br>Frankfurt/Main, all of Germany |
|---|---|---|
| [21] | Appl. No. | 49,567 |
| [22] | Filed | June 24, 1970 |
| [45] | Patented | Nov. 30, 1971 |
| [73] | Assignee | Farbwerke Hoechst Aktiengesellschaft<br>vormals Meister, Lucius & Bruning<br>Frankfurt am Main, Germany |
| [32] | Priority | July 1, 1969 |
| [33] | | Germany |
| [31] | | P 19 33 235.5 |

[54] THERMOPLASTIC POLYESTER MOULDING COMPOSITIONS CONTAINING SODIUM FLUORIDE
4 Claims, No Drawings

[52] U.S. Cl. .................................................. 260/75 H,
117/138.8 F, 260/75 T, 264/328
[51] Int. Cl. .................................................... C08g 39/04
[50] Field of Search .......................................... 260/75 H,
75 T

[56] References Cited
UNITED STATES PATENTS
3,506,619  4/1970  Stewart et al. ............... 260/75
FOREIGN PATENTS
1,501,269  10/1967  France Primary Examiner—Melvin Goldstein
Attorney—Curtis, Morris & Safford ABSTRACT: Thermoplastic moulding compositions suitable for injection moulding on the basis of linear saturated polyesters of aromatic dicarboxylic acids with diols to which 0.005 to 5 percent by weight sodium fluoride has been added to improve the processing properties.

THERMOPLASTIC POLYESTER MOULDING COMPOSITIONS CONTAINING SODIUM FLUORIDE

The present invention relates to thermoplastic polyester molding compositions containing sodium fluoride.

It has been proposed to process thermoplastic molding compositions comprising linear saturated polyesters of aromatic dicarboxylic acids by injection molding or extrusion to obtain molded articles.

It is known that the said molded articles have a number of valuable properties, for example dimensional stability under heat and hardness, only if they have a sufficiently high crystallinity.

In order that the polyester molding composition may reach the required degree of crystallinity rapidly in the heated mold when it is processed to molded articles, it has been proposed to add solid inorganic substances, for example metal oxides, alkaline earth metal salts, talc powder, glass powder or metals, as crystallization promoting substances (nucleating agents). These inorganic substances advantageously have a grain size of less than 2 microns.

The aforesaid nucleating agents suffer, however, from certain disadvantages.

They cannot be added to the polyester in any desired manner, for example in the most economical manner by addition to the melt when preparing the polyester, without putting up with disadvantages in the manufacture of the polyester, for example prolonged times of condensation, and drawbacks concerning the material obtained, for example discolorations. Furthermore, the manner in which the nucleating agent is added to the polyester often has a strong influence, and, when the addition is made during the manufacture of the polyester, a strong negative influence on the effectiveness of the nucleating agent in the resulting molding composition.

Finally, the effectiveness of the said nucleating agents is very different even with one and the same sufficiently fine particle size. An inorganic substance which is insoluble in the polyester generally produces only an insufficient nucleation even if it is present in a very small particle size. Some determined substances, however, have a specific, considerably better nucleating action.

Inorganic solid substances that are hardly effective as nucleating agents are, inter alia, salts such as, for example, sodium chloride and sodium sulfate. It was therefore surprising to find that sodium fluoride is a substance which in its nucleating action excels the other inorganic substances which generally have only a poor action.

We have found that thermoplastic molding compositions comprising a mixture of a. linear saturated polyesters of aromatic dicarboxylic acids and optionally small amounts of aliphatic dicarboxylic acids with saturated aliphatic or cycloaliphatic diols, and b. sodium fluoride having a particle size of less than 10 microns, preferably less than 2 microns, in an amount within the range of from 0.005 to 5 percent by weight, preferably 0.02 to 0.5 percent by weight, can be injection-molded in an economical manner to yield crystalline molded articles.

When molding compositions of polyethylene terephthalate containing sodium fluoride are processed, an adequate crystallinity is obtained in the heated mold after a shorter time than with almost all other inorganic solid substances that have been examined, even with the use of considerably smaller amounts of sodium fluoride.

Sodium fluoride has the further advantage that it can be admixed with the polyester during the manufacture of the polyester before the polycondensation, without interfering with the polycondensation and without pronounced discoloration of the polyester.

The sodium fluoride is preferably added in ground form in a grain size of less than 10 microns, preferably a grain size of below 2 microns. The amount of sodium fluoride added to the polyester may be within the range of from 0.005 to 5 percent by weight, preferably 0.02 to 0.5 percent by weight, calculated on the polyester.

The sodium fluoride may also be used in combination with other nucleating agents, for example talc or boron nitride. The polyester molding composition should contain 0.01 to 5 percent by weight, preferably 0.05 to 0.5 percent by weight, of the combination of sodium fluoride and other nucleating agents, the amount of sodium fluoride being advantageously at least 0.005 percent by weight, preferably at least 0.05 percent by weight, calculated on the total weight of the polyester molding composition.

As linear saturated polyester of aromatic dicarboxylic acids, polyethylene terephthalate is advantageously used. Other polyesters, for example polycyclohexane-1,4-dimethylol terephthalate may, however, also be used.

It is also possible to use modified polyethylene terephthalates which contain, in addition to terephthalic acid, also other aromatic or aliphatic dicarboxylic acids as basic units, for example, isophthalic acid, naphthalene-dicarboxylic acid-2,6 or adipic acid. There may also be used modified polyethylene terephthalates which contain, in addition to ethylene glycol, also other aliphatic diols, for example neopentyl glycol or butanediol-1,4 as the alcoholic component. Polyesters of hydroxycarboxylic acid may likewise be used.

The polyester mass advantageously contains as little moisture as possible, preferably less than 0.01 percent by weight.

To keep the absorption of moisture as low as possible the granulated polyester molding composition may be coated with an inert hydrophobic substance, for example paraffin or wax.

Such waxes may also be used for improving the flow properties, that is the rheological properties. To additionally facilitate the removal from the mold of the injection molded piece, specific additives may be added to the granular polyester, for example neutral or partially neutralized montan wax salts or montan wax ester salts, alkali metal paraffin sulfonates or alkali metal olefin sulfonates.

To improve the impact strength, suitable high polymers, for example copolymers of ethylene with vinyl acetate, ethylene with acrylic acid esters or butadiene with styrene, may be added to the polyesters in known manner.

The polyester contained in the molding composition in accordance with the invention should have a reduced specific viscosity within the range of from 0.9 to 2.0 dl./g., preferably 1.0 to 1.5, determined at 25° C. in a solution of 1 gram polyester in 100 milliliters of a mixture of phenol and tetrachlorethane in a weight ratio of 3:2. If the reduced specific viscosity of the polyester in the molding composition is too low, the molding composition may be after-condensed in known manner in the solid phase. When the molding composition is made by homogenization in an extruder, it is advantageous to take into consideration a possible degradation of the polyester and therefore a reduction of the reduced specific viscosity connected therewith, when choosing the polyester to be used as starting product.

To obtain injection-molded articles of good crystallinity, the mold is advantageously kept at a temperature well above the second order transition temperature. For polyester molding compositions on the basis of a modified polyethylene terephthalate mold temperatures within the range of from 120° to 160° C. are preferably used.

The molding compositions of the invention can be used for the manufacture of high-quality molded articles of high dimensional stability, for example gear wheels, bevel wheels, racks, coupling disks and guide members.

The following examples serve to illustrate the invention.

EXAMPLE 1

Granular polyethylene terephthalate having a grain size of about 2.5 millimeters, a reduced specific viscosity of 1.39 dl./g. (determined at 25° C. in a solution of 1 gram polyester in 100 milliliters of a mixture of phenol and 1,1,2,2-tetrachlorethane in a weight ratio of 3:2) and a content of water of 0.008 percent was mixed for 6 hours with 0.2 percent by weight of ground sodium fluoride (mean particle size 1 micron) with the exclusion from moisture in an airtight mixed with 50 revolutions per minute.

The granular polyester product which had thus been superficially provided with sodium fluoride was directly injection-molded into plates 60×60×2 millimeters on an injection machine at a mold temperature of 140° C. After an injection time and dwell time of 15 seconds the plates were left for a certain time (residence time) in the mold to crystallize. The mean density of the resulting plates as a function of the residence time is indicated in the following table 1.

TABLE 1

| Residence time in sec. | 10 | 25 | 45 | 60 |
|---|---|---|---|---|
| Density g./cm. | 1.366 | 1.369 | 1.369 | 1.370 |

The above values show that after a residence time of 25 seconds the density and consequently the crystallinity have come near enough to the obtainable final value to prevent the material from being deformed by after-crystallization during use at elevated temperatures.

The densities indicated in this and the following examples are those of the pure polyester because only these indicate its degree of crystallization. The proportion of density contributed by the admixed sodium fluoride was subtracted by calculation, assuming a simple proportionate additivity of the densities, which is admissible in a first approximation. The density was measured according to DIN 53 479 at 25° C. in cyclohexane.

When the same granular polyester was mixed in the same manner with ground calcium carbonate and magnesium oxide, respectively, the density came near the obtainable final value only after considerably longer residence times, that is after 60 and 80 seconds, respectively.

EXAMPLE 2

A granular polyester which had been admixed in the manner described in example 1 with the amounts of sodium fluoride indicated below, was homogenized in a vertical extruder at 275° C. extruded into water in the form of a wire and granulated. The granular products so obtained were dried in an eccentric tumbling dryer under a pressure of 0.2 millimeter of mercury for 2 hours at 100° C. and 5 hours at 180° C. and crystallized, a water content of 0.01 percent being reached.

The polyester materials were then after-condensed in the same eccentric tumbling dryer at 240° C. under a pressure of 0.2 millimeter of mercury for 3 hours to obtain a reduced specific viscosity of about 1.4 dl./g.

The materials so obtained were injection-molded into plates as described in example 1. After a residence time of 25 seconds the plates had a crystallinity and consequently a stiffness which enabled the plates to be ejected from the mold in an unobjectionable manner without deformation by the ejector pins.

The density of the plates as a function of the residence time is indicated in the following table 2.

TABLE 2

| Residence time in seconds | 10 | 25 | 45 | 60 |
|---|---|---|---|---|
| Density with 0.05% NaF | 1.357 | 1.361 | 1.365 | 1.368 |
| Residence time in seconds | 10 | 25 | 45 | 60 |
| Density with 0.10% NaF | 1.365 | 1.369 | 1.370 | 1.370 |
| 0.20% NaF incorporated by granulation g./cm.³ | 1.367 | 1.370 | 1.371 | 1.370 |

EXAMPLE 3

A granular polyester which had been regranulated with 0.2 percent sodium fluoride as described in example 2 and after-condensed to a reduced specific viscosity of 1.43 dl./g. was rolled for 6 hours with 0.2 percent sodium montanate (melting point 187° C.) with the exclusion from moisture in a mixer with 20 revolutions per minute.

The waxes material so obtained was injection-molded into plates as described in example 1. After a residence time of 25 seconds the plates had a density of 1.372 g./cm.³ and could very easily be removed from the mold automatically.

EXAMPLE 4

Ten kilograms dimethyl terephthalate and 8.8 kilograms ethylene glycol were subjected in known manner to an ester interchange with 3.15 grams manganese (II) acetate. $4H_2O$ as catalyst. Then 3.45 grams germanium phosphite and 40 grams ground sodium fluoride, suspended in 200 milliliters glycol, were added. The pressure in the condensation vessel was then reduced from an initial 760 millimeters of mercury to 0.06 millimeter of mercury within 1 hour, while stirring, and the temperature of the reaction mixture was increased from an initial 220° C. to 285° C. by applying the corresponding external temperature, and the condensation was continued under these conditions. 2½ hours after beginning to reduce the pressure, the polyester had a reduced specific viscosity of 0.9 dl./g. It was discharged into ice water and granulated.

After drying for 3 hours at 100° C. and then for a further 3 hours at 180° C. under a pressure of 0.4 millimeter of mercury, the material was after-condensed at 240° C. under a pressure of 0.2 millimeter of mercury for 12 hours in an eccentric tumbling dryer to obtain a reduced specific viscosity of 1.43 dl./g.

After waxing with 0.2 percent by weight sodium montanate as described in example 3, the material was injection-molded into plates.

The plates could very easily be removed from the mold automatically and had a density of 1.372 g./cm.³

What is claimed is:
1. Thermoplastic molding compositions comprising a mixture of
   a. a linear saturated polyester of an aromatic dicarboxylic acid and optionally a small amount of an aliphatic dicarboxylic acid with a saturated aliphatic or cycloaliphatic diol, and
   b. sodium fluoride of a particle size of below 10 microns, the amount of sodium fluoride being within the range of from 0.005 to 5 percent by weight calculated on the polyester.
2. A thermoplastic molding composition as claimed in claim 1 wherein the polyester is polyethylene terephthalate.
3. A thermoplastic molding composition as claimed in claim 1 wherein the sodium fluoride has a particle size of less than 2 microns.
4. A thermoplastic molding composition as claimed in claim 1 wherein the amount of sodium fluoride is within the range of from 0.02 to 0.5 percent by weight, calculated on the polyester.

* * * * *